(12) United States Patent
Methley et al.

(10) Patent No.: US 6,298,116 B1
(45) Date of Patent: Oct. 2, 2001

(54) X-RAY EXAMINATION APPARATUS

(75) Inventors: Peter Brian Methley; Theodorus Antonius Van Der Heijden, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/606,393

(22) Filed: Jun. 29, 2000

(30) Foreign Application Priority Data

Jul. 6, 1999 (EP) .................................................. 99202181

(51) Int. Cl.[7] .................................................... H05G 1/06
(52) U.S. Cl. ............................................. 378/101; 378/103
(58) Field of Search ................................. 378/101, 103, 378/106

(56) References Cited

U.S. PATENT DOCUMENTS

| | | | |
|---|---|---|---|
| 4,053,778 | 10/1977 | Franke | 250/402 |
| 5,187,737 * | 2/1993 | Watanabe | 378/105 |
| 5,200,984 * | 4/1993 | Laeuffer | 178/110 |
| 5,408,484 | 4/1995 | Weimel | 372/38 |
| 5,546,441 * | 8/1996 | Stage | 378/110 |
| 6,169,782 * | 1/2001 | Zetterlund | 378/103 |

* cited by examiner

Primary Examiner—Robert H. Kim
Assistant Examiner—Irakli Kiknadze
(74) Attorney, Agent, or Firm—John F. Vodopia

(57) ABSTRACT

An X-ray examination apparatus is provided with a DC voltage source which is to be connected to a maines voltage and whereto there are connected an accumulator with a charging circuit for this the accumulator as well as a high voltage generator for an X-ray tube. The accumulator is charge in a standby mode; the accumulator can be discharged via the high voltage generator. There is provided a power gate circuit via which power up to a maximum value can be drawn from the mains, the accumulator being chargeable for as long as this maximum value has not yet been reached; when a power beyond said maximum value is required, the surplus beyond this maximum value is delivered by the accumulator via said power gate circuit.

5 Claims, 2 Drawing Sheets

X-RAY EXAMINATION APPARATUS

The invention relates to an X-ray examination apparatus which includes a DC voltage source which is to be connected to a mains voltage and whereto there are connected an accumulator with a charging circuit for this accumulator as well as a high voltage generator for an X-ray tube, the accumulator being charged in a standby mode and being dischargeable via the high voltage generator.

An X-ray examination apparatus of this kind is known from United States patent U.S. Pat. No. 4,053,778. The accumulator in the apparatus described therein can be charged in a standby mode, but energy is drawn from the accumulator each time when an X-ray exposure takes place. Consequently, the accumulator is frequently loaded so that its service life is undesirably reduced.

It is an object of the invention to use accumulators in a manner such that their service life is significantly prolonged.

To this end, an X-ray apparatus of the kind set forth according to the invention is characterized in that there is provided a power gate circuit via which power can be drawn from the mains up to a maximum value, it being possible to charge the accumulator for as long as this maximum value has not yet been reached, and via which, when a power in excess of said maximum value is required, the surplus beyond said maximum value is delivered by the accumulator. In other words, when the load current required for an X-ray exposure is less than the current which can be safely drawn from the mains, it is provided by the mains. When a surplus of current can be drawn from the mains, such a surplus will be used to charge the accumulator. It is only when the maximum current to be drawn from the mains is reached that a further required surplus current will be delivered by the accumulator. Evidently, the maximum current to be drawn from the mains is co-determined by the current drawn by further power supply units for further parts or components of the X-ray examination apparatus. The mains is thus efficiently used, the accumulator nevertheless not being unnecessarily discharged, thus prolonging the service life of the accumulator. It is to be noted that, of course, it is also possible to charge the accumulator in periods during which the high voltage generator of the X-ray apparatus does not constitute a load for the mains.

A simple and efficient embodiment of the power gate circuit includes a first diode (D1) via which power can be drawn from the mains up to a maximum value, and a second diode (D2) via which the surplus said maximum value is delivered by the accumulator.

The DC voltage source in a specific embodiment is provided with a power control unit which includes a current sensor for measuring the mains current, and also a controllable rectifier unit with a filter, the output voltage of the DC voltage source being reduced in the rectifier unit when the maximum mains current is reached, the second diode (D2) also becoming conductive when said output voltage drops below that across the accumulator. The rectifier unit may include, for example, a thyristor bridge circuit or a circuit with switching transistors which are controlled by the power control unit. As a result of this step it is achieved that, in the case of maximum loading of the mains, the output voltage of the DC voltage source decreases until the instant at which the second diode (D2) becomes conductive and power is delivered by the accumulator.

The invention will be described in detail hereinafter with reference to the accompanying drawing. Therein:

Figure 1:
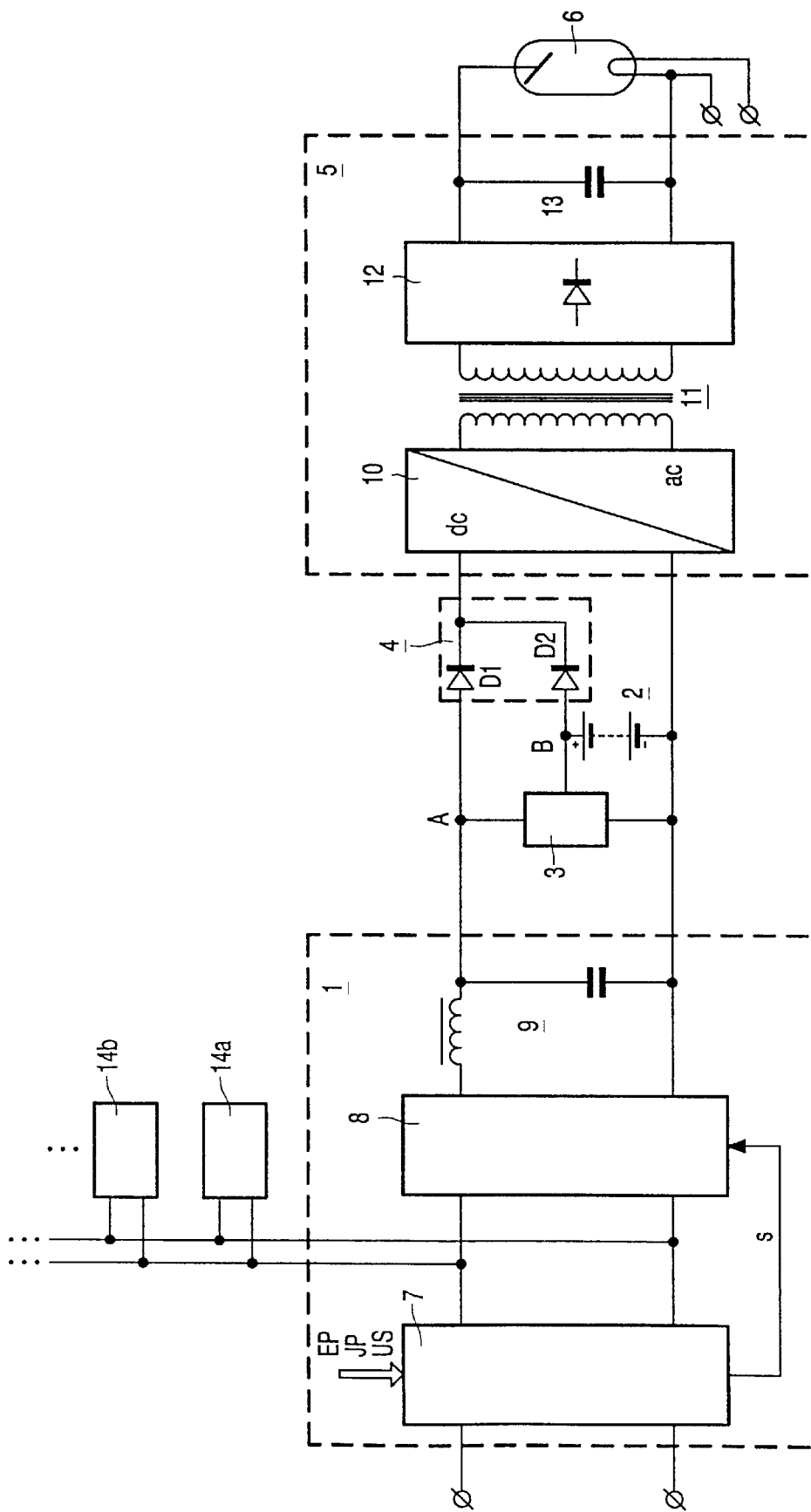
FIG. 1 shows diagrammatically a first embodiment of a power supply for an X-ray tube in an X-ray examination apparatus according to the invention.

As is shown in FIG. 1, the power supply in a first embodiment includes a DC voltage source 1 which can be connected to the mains, and also an accumulator 2 with a charging circuit 3, and a power gate circuit 4, said charging circuit and gate circuit being connected to the DC voltage source whereas the accumulator is connected between the charging circuit and the gate circuit. Also provided is a high voltage generator 5 which is connected to the gate circuit and delivers the high voltage for an X-ray tube 6. The high voltage generator 5 is connected, via the gate circuit 4, to the DC voltage source 1 as well as to the accumulator 2.

The DC voltage source includes a power control unit 7 and a controllable rectifier unit 8 which is provided with a filter 9. The rectifier unit 8 may be formed, for example by a thyristor bridge circuit or by a circuit with switching transistors, the thyristors or the transistors being controlled by the power control unit 7. As more power is demanded, the thyristors are driven further so that more current is delivered. When the X-ray apparatus requires more than the maximum current that can be delivered by the DC voltage source 1, when the maximum current is reached the rectifier unit 8 will be driven so that the current is limited, the output voltage of the DC voltage source, i.e. the voltage at the point A, then decreasing to a value for which the current surplus can be delivered by the accumulator 2; the X-ray apparatus continues to draw said maximum current from the mains via the DC voltage source. In order to realize such control, the power control unit 7 is provided with a current sensor for measuring the mains current. When the maximum mains current is reached, a control signal S is applied to the rectifier unit 8. The maximum power that can be drawn from the mains by the high-voltage supply unit 5, of course, is co-determined by the current drawn by the power supply units 14a, 14b, etc. for further parts or components of the X-ray examination apparatus. Furthermore, the maximum power to be drawn from the mains differs, for example for the United States of America (110 V, 15 A), Europe (230 V, 16 A), and Japan (100 V, 25 A); therefore, the power control unit 7 is also provided with adjusting means for adapting the maximum power to be drawn from the mains, and hence the maximum current to be drawn from the mains, to a relevant country.

The maximum power that can be drawn from the mains by the high-voltage generator 5, via the DC voltage source 1, is given by the voltage and the current at the point A. For as long as the X-ray apparatus does not yet demand the maximum power, a power whose value equals the difference between the maximum power that can still be drawn from the mains, taking into account the power drawn by the units 14a, 14b, etc., and the power requested by the X-ray apparatus can be used to charge the accumulator 2. For example, if the maximum power still to be drawn from the mains is 600 W and the maximum charging power of the accumulator is 150 W (corresponding to an accumulator voltage of, for example 26×14 V and a maximum charging current of 450 mA), the accumulator can be fully charged for as long as the requested power is less than 450 W. If the requested power is between 450 W and 600 W, only a part of the maximum charging power can be applied to the accumulator. If the requested power is 600 W, the accumulator is no longer charged. If the requested power is higher than 600 W, the accumulator will have to deliver the power in excess of 600 W; therefore, the accumulator is discharged only in that event. The accumulator will be fully charged when the high voltage generator of the X-ray apparatus is not loaded.

In this case the power gate circuit 4 is composed of two diodes D1 and D2. When the voltage at the point A is controlled downwards, when the maximum current to be drawn from the mains is reached, and drops below the voltage at the point B, the accumulator 2 delivers the excess current via the diode D2. This means that the accumulator 2 provides supplementary power only if the maximum power to be drawn from the mains is already delivered via the diode D1.

The high voltage generator 5 has a conventional construction which includes a DC/AC converter 10, a high voltage transformer 11, and a high voltage rectifier 12 with a buffer capacitor 13. In the context of the present invention it will not be necessary to describe the operation thereof.

Figure 2:
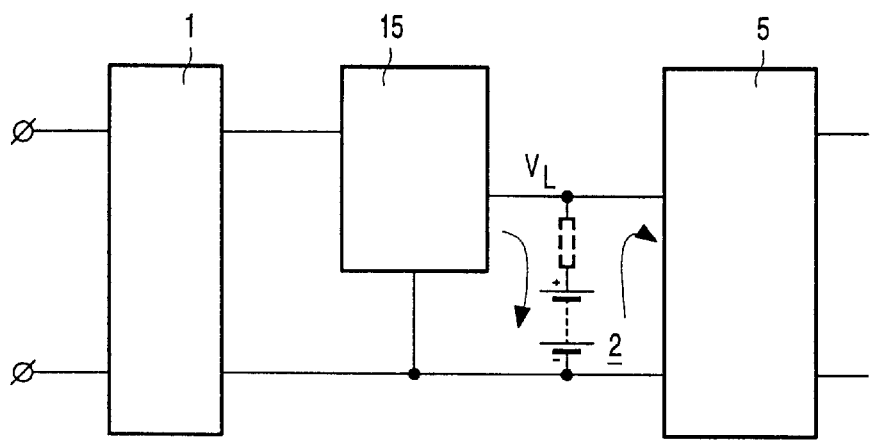
FIG. 2 shows a second embodiment according to the invention.
Figure 3A:
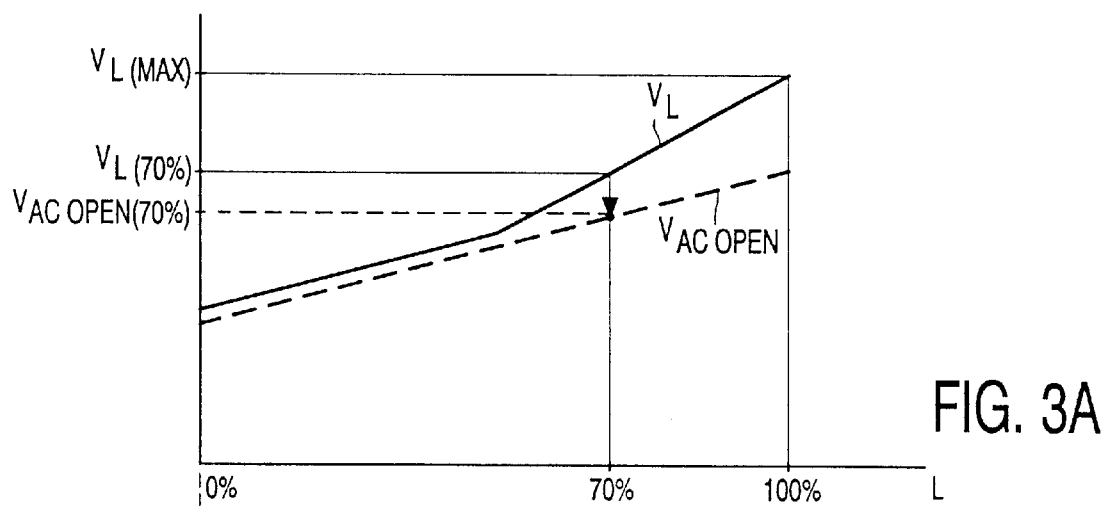
FIGS. 3a, 3b show two diagrams illustrating the operation of the second embodiment.
Figure 3B:
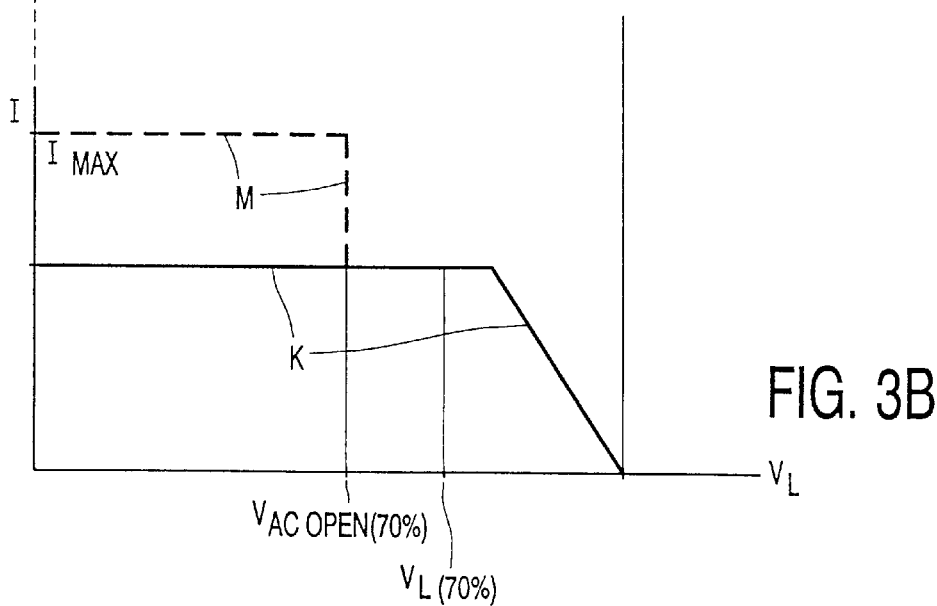

FIG. 2 shows an alternative solution for efficient use of the mains, power then being drawn from the mains only so as to ensure a comparatively small load by the high voltage generator. The power supply for the X-ray examination apparatus in this alternative embodiment is also provided with a DC voltage source 1 which is to be connected to mains voltage, an accumulator 2 (whose internal resistance $R_i$ is represented by dashed lines), a charging circuit for this accumulator, and a high voltage generator 5 which is connected to the DC voltage source and the accumulator. As opposed to that shown in FIG. 1, the rectifier unit in the DC voltage source 1 in the present embodiment is not controllable. In this embodiment the power supply also includes a microprocessor which is denoted by the reference numeral 15, together with the charging circuit. The microprocessor cum charging circuit will be referred to hereinafter as the charging unit 15. The charging unit 15 includes means for measuring the output voltage of the charging unit $V_L$ in the absence of loading by the high voltage generator (on-charge voltage) and for determining, on the basis of this measured value, the charging percentage of the accumulator for $V_L$ and the open circuit accumulator voltage $V_{ACopen}$ at this charging percentage, for example by means of tables stored in a memory of the microprocessor. For a given embodiment FIG. 3a shows the voltage values $V_L$ and $V_{ACopen}$ as a function of the charging percentage of the accumulator, while FIG. 3b shows (inter alia) the charging characteristic K of the accumulator. When current is drawn by the high voltage generator 5 in order to perform an X-ray exposure during the charging of the accumulator, for example at an instant at which it has been charged for 70%, the voltage at the output of the charging unit 15 will decrease as from the value $V_{L(70\%)}$. If a large amount of current is drawn by the high voltage generator, in this example the accumulator 2 will start to deliver current when the voltage at the output of the charging unit 15 drops below the value $V_{ACopen\ (70\%)}$. However, for as long as the maximum current that can be drawn from the mains has not yet been reached, such discharging of the accumulator should be counteracted.

Therefore, according to the invention the charging unit 15, acting continuously as the current source, is switched over to the mode in which it acts as a voltage source as soon as the output voltage of the charging circuit 15 drops below the value $V_{ACopen}$. The output voltage of the charging unit 15 is then maintained at this value $V_{ACopen}$. During the period in which the charging unit 15 acts as a voltage source, the accumulator will not be charged. As a result of this step, more current can be drawn from the mains, that is to say, until the maximum current to be drawn from the mains is reached. Subsequently, the output voltage of the charging circuit 15 will decrease further and the accumulator will be discharged. Said maximum value is again dependent on the maximum current that can be drawn from the mains, being different in Europe, Japan and the USA, and on the current already drawn by further power supply units in the X-ray examination apparatus. In FIG. 3b this situation is represented by the dashed line M. Thus, optimum current is drawn from the mains and the accumulator delivers a required excess current. This is because the accumulator delivers a current only when the maximum current is drawn from the mains and the output voltage of the charging circuit 15 becomes lower than $V_{ACopen}$. Conversely, when the high voltage generator no longer draws current, the output voltage of the charging circuit 15 will increase until the value $V_{ACopen}$ is reached, after which the charging unit, previously active as a voltage source, starts to act as a current source again and the accumulator is recharged.

What is claimed is:

1. An X-ray examination apparatus which includes a DC voltage source which is to be connected to a mains voltage and whereto there are connected an accumulator with a charging circuit for this accumulator as well as a high voltage generator for an X-ray tube, the accumulator being charged in a standby mode and being dischargeable via the high voltage generator, characterized in that there is provided a power gate circuit via which power up to a maximum value can be drawn from the mains, it being possible to charge the accumulator for as long as this maximum value has not yet been reached, and via which, when a power in excess of said maximum value is required, the surplus beyond said maximum value is delivered by the accumulator.

2. An X-ray examination apparatus as claimed in claim 1, characterized in that the power gate circuit includes a first diode (D1) via which power up to a maximum value can be drawn from the mains, and a second diode (D2) via which the surplus beyond said maximum value is delivered by the accumulator.

3. An X-ray examination apparatus as claimed in claim 2, characterized in that the DC voltage source is provided with a power control unit which includes a current sensor for measuring the mains current, and a controllable rectifier unit with a filter, the output voltage of the DC voltage source being reduced in the rectifier unit when the maximum mains current is reached, the second diode (D2) also becoming conductive if said output voltage drops below that across the accumulator.

4. An X-ray examination apparatus which includes a DC voltage source which is to be connected to a mains voltage and whereto there are connected an accumulator with a charging circuit for this accumulator as well as a high voltage generator for an X-ray tube which is connected to the DC voltage source and to the accumulator, characterized in that the charging circuit may be active in a first mode in which it acts as a current source and in a second mode in which it acts as a voltage source, there being provided a microprocessor which ensures that, when the output voltage of the charging circuit decreases to the open circuit accumulator voltage at a given charging percentage of the accumulator, due to the switching on of a load by the high voltage generator, the charging circuit is switched over from the first to the second mode, after which the accumulator will start to deliver current only after a maximum amount of current is drawn from the mains by the charging circuit in the second mode, and that, when the output voltage of the charging circuit becomes higher than the open circuit accumulator voltage again, due to the switching off of the load by the high voltage generator, the charging circuit is switched over from the second to the first mode again.

5. An X-ray examination apparatus as claimed in claim 4, characterized in that the charging circuit is provided with means for measuring the output voltage of the charging unit in the absence of a load, the microprocessor enabling the determination of the charging percentage of the accumulator from said output voltage and of the associated open circuit accumulator voltage on the basis of said charging percentage.

* * * * *